S. WARMINSKI.
HORSESHOE.
APPLICATION FILED FEB. 27, 1918.
1,273,294.
Patented July 23, 1918.
2 SHEETS—SHEET 1.
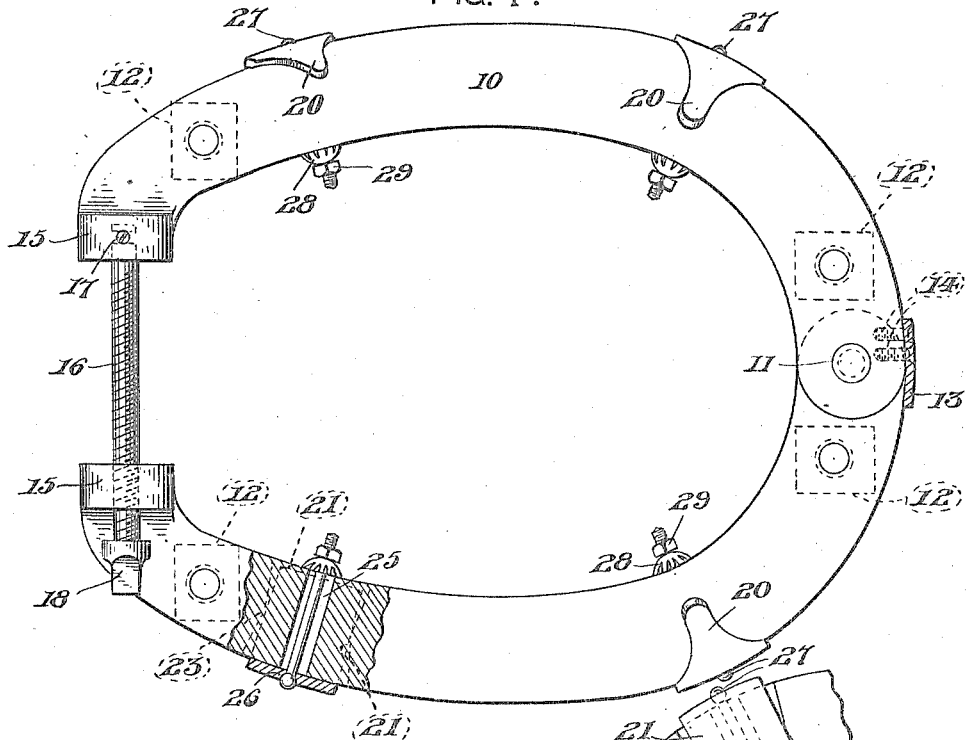
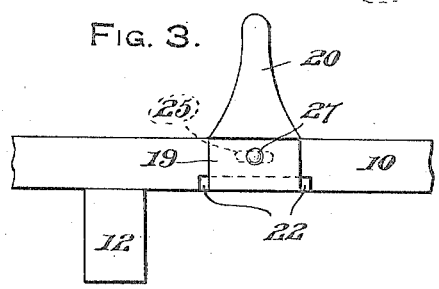
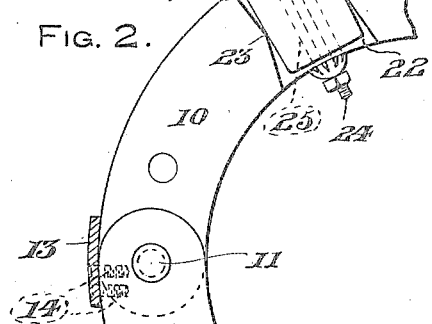
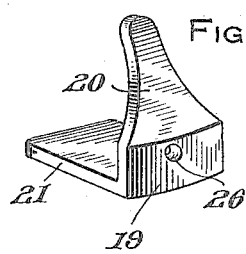
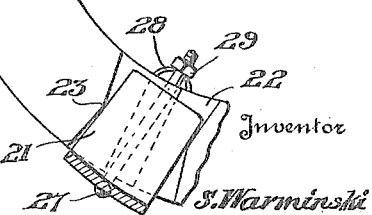
Inventor
S. Warminski
By A. M. Wilson
Attorney

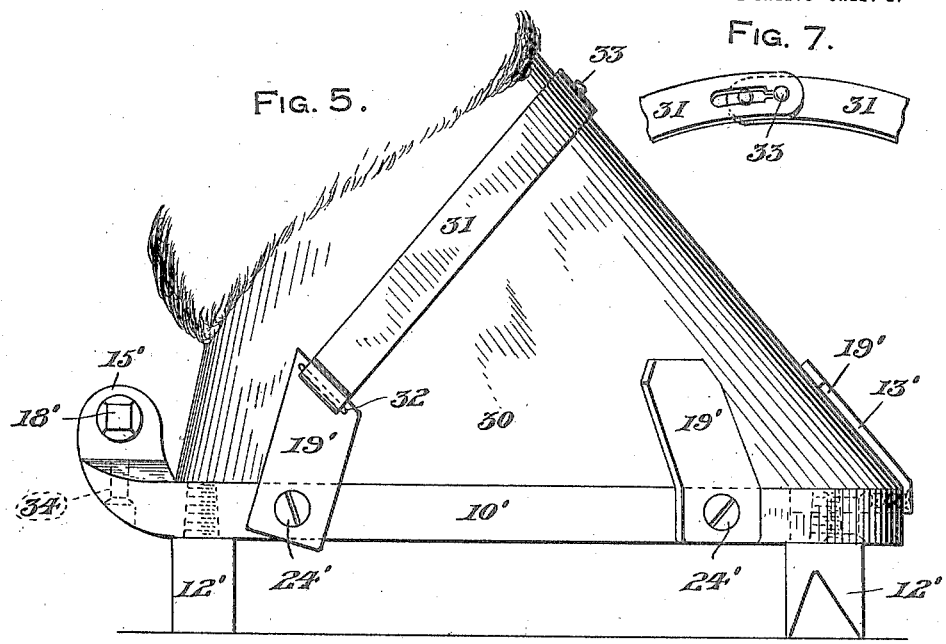
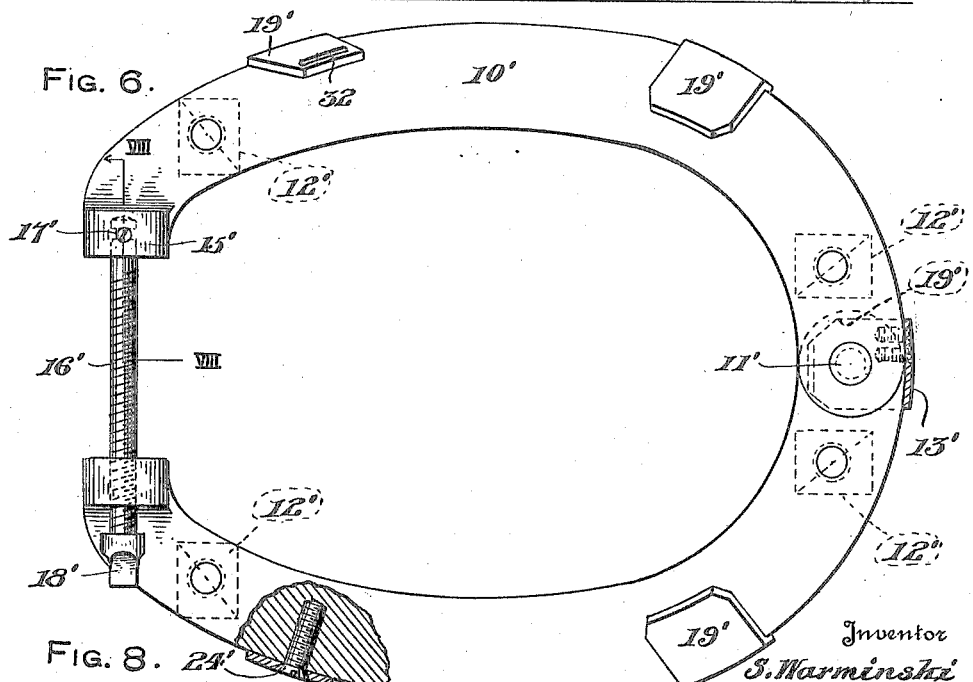

UNITED STATES PATENT OFFICE.

STANISLAW WARMINSKI, OF BALTIMORE, MARYLAND.

HORSESHOE.

1,273,294.  Specification of Letters Patent.  Patented July 23, 1918.

Application filed February 27, 1918. Serial No. 219,440.

*To all whom it may concern:*

Be it known that I, STANISLAW WARMINSKI, a citizen of Russia, residing at Baltimore, in the State of Maryland, have invented certain new and useful Improvements in Horseshoes, of which the following is a specification.

My invention in horseshoes relates more especially to expansible shoes for animals serviceable wherever desired such for instance as an emergency shoe.

The primary object of the invention is to provide a horseshoe adapted to be easily clamped upon a horse's hoof without the employment of the usual nails and arranged for engaging the uneven side surfaces of the animal's hoof, the device possessing great strength and utility.

A further object of the invention is to provide an expansible horseshoe readily adjusted in secured relations upon hoofs of different sizes and shapes and being adapted to be readily carried for immediate use in case the horse loses a shoe while traveling upon the road.

In the drawings forming a part of this application and in which like numerals refer to corresponding parts throughout the several views:—

Figure 1 is a top plan view of a shoe embodying my invention with a side portion and the toe guard broken away;

Fig. 2 is an inverted plan view of the forward portion thereof;

Fig. 3 is a side elevation of a portion of the shoe;

Fig. 4 is a perspective view of one of the side brackets employed with the device;

Fig. 5 is an elevational view of a modified form of the shoe operatively positioned upon a horse's hoof;

Fig. 6 is a top plan view thereof partially broken away;

Fig. 7 is a perspective view of a detachable connection employed with the bracing strap arranged in this form of the device; and Fig. 8 is a sectional view illustrating the swivel mounting for the clamping screw taken upon line 8 of Fig. 6.

Referring more in detail to the drawings, my horseshoe broadly consists of two arcuate sections 10 hinged together by a rivet 11 at their forward ends and normally positioned in substantially the arched form of a usual horseshoe. Calks 12 are removably secured upon the bottom of the shoe while a toe guard 13 of any desired form is secured at the forward end of the shoe by means of screws 14 attaching the said guard to the outer side of one of the sections 10 adjacent the rivet 11. A block 15 is provided at the rear end of each of the sections 10 having a clamping screw 16 threaded through one of the said blocks while one end of the screw is swiveled as at 17 within the other block so that the screw may be readily turned by means of a square head 18 at the free end of the screw for moving the blocks 15 and the heel portions of the sections 10 toward and away from each other.

Angular brackets 19 are carried by the sections 10 for engaging the outer sloping side of the hoof and are adjustably mounted whereby the upward inclined portions 20 of the brackets may firmly engage different forms of uneven or irregular hoof surfaces. The bottom portions 21 of the brackets are in the form of plates shiftably positioned within shallow transverse slots 22 upon the bottom of the sections 10, the said slots having contracted central portions 23 while the slots have opposite portions flaring inwardly and outwardly so as to permit the plate 21 to slightly turn in any direction when positioned therein. Retaining bolts 24 extend through enlarged openings 25 through the sections 10 and also through perforations 26 in the sides 20 of the brackets for maintaining the brackets in their adjusted relations upon the shoe sections 10. Globular heads 27 are provided for the outer ends of the bolts 24 countersunk in the outer ends of the perforations 26 while spring washers 28 are arranged upon the inner portions of the bolts 24 for maintaining the brackets 19 in their adjusted positions when the lock-nuts 29 of the bolts are tightened upon the said washers.

The clamping screws 16 may be released sufficiently for permitting the shoe to be engaged upon the bottom of the animal's hoof with the brackets 19 engaging the sides of the hoof when the nuts 29 are loosened upon the securing bolts 24. The brackets 19 may then be readily shifted for engaging the hoof to best advantage and the nuts 29 tightened and the screws 16 turned for swinging the sections 10 toward each other and thereby locking the shoe in its operative position upon the horse's hoof. The toe guard 13 will engage the toe portion of the hoof while the brackets 19 engage four different portions of the hoof so that the shoe will be securely positioned and capable of use for all ordinary travel, it being noted that the employment of a wrench, not shown, is all that is necessary to attach or detach the device. The shoe may be adjusted by means of the securing bolts 24 and the clamping screw 16 for mounting upon hoofs of slightly different sizes as well as hoofs having irregular outer faces.

In the form of the invention shown in Figs. 5, 6 and 7 it will be seen that the shoe sections 10' are forwardly hinged together as at 11' being provided with a toe guard 13' and also with a clamping screw 16' in substantially the manner heretofore described while removable calks 12' are arranged upon the bottom of the shoe.

Side brackets 19' are secured by means of screws 24' to the outer sides of the shoe sections 10' for engaging the adjacent sides of the hoof such as 30. A two-part loop or band 31 is secured within slots 32 of the rearwardly positioned brackets 19' for engaging around the hoof 30 as illustrated in Fig. 5 of the drawings. A detachable connection 33 is provided for the inner ends of the side sections of the band 31. The swiveling of the screw 16 as at 17' to one of the blocks 15' at the heel portion of the shoe is illustrated in Fig. 8, the said block having a spindle 34 journaled in the rear end portion of the shoe section 10'. In this form of the device it will be seen that the brackets 19' and the toe guard 31' engage the sides of the hoof 30 while the screw 16' clamps the shoe in its operative arrangement upon the hoof.

What I claim as new is:—

1. In combination with an adjustable horseshoe having the sections thereof arranged with transverse flaring slots upon the bottom thereof and with transverse openings above the said slots, angular brackets shiftably positioned within the said slots having hoof-engaging portions projecting above the shoe, and securing bolts passing through said brackets and shiftably extending through the said openings.

2. A horseshoe having a transverse slot in its lower face and a transverse opening above the slot, an angular bracket having a portion thereof adapted for shiftably turning within said slot and further having a hoof-engaging portion projecting above the shoe, a retaining bolt projecting through the bracket and freely positioned for lateral adjustment through the said opening, and adjustment retaining means for the bracket mounted upon the bolt inwardly of the shoe.

3. In combination with a horseshoe having relatively shiftable side sections, each of said sections having transverse oppositely flaring slots upon its lower face and further having an opening transversely arranged centrally above each of said slots, an angular bracket for each slot having a bottom plate portion shiftably arranged within the slot, each of said brackets further having an upwardly projecting hoof-engaging portion outwardly of the shoe extending thereabove, a retaining bolt for each bracket projecting through the outer side of the bracket and freely positioned for lateral shifting movement through the adjacent perforation, a retaining washer upon the inner end portion of each bolt engaging the adjacent inner face of the shoe section, and a locking nut upon each bolt in operative engagement with the washer thereof.

4. In combination with a horseshoe having a side section arranged with a transverse slot in its bottom face having a contracted central portion and oppositely flaring portions opening inwardly and outwardly of the shoe, an angular bracket having a bottom plate portion arranged within said slot adapted for slight turning movement therein, the said bracket further having an upwardly extending hoof-engaging portion projecting above the shoe, the said shoe section having a transverse opening therein centrally above the said slot, a retaining bolt laterally shiftably positioned through the said opening having a globular head upon its outer end in countersunk engagement with the said bracket, and adjustment retaining means for the said bracket operatively arranged upon the opposite end of the bolt inwardly of the shoe.

5. In combination with a horseshoe having arcuate side sections, a rivet pivotally connecting the forward ends of said sections together, a toe guard secured to the forward end of one of said sections adjacent said rivet, a clamping screw operatively connected between the rear ends of said sections, said sections having transverse flaring slots upon their lower sides and with openings extending through the sections above said slots, angular brackets shiftably arranged within said slots with upwardly projecting hoof-engaging portions and retaining bolts extending through said brackets, and laterally movable within said openings in secured arrangement upon the sections.

6. A horseshoe comprising, in combination, a pair of arcuate side sections pivotally connected together at their forward ends and having upwardly extending block portions at their rear ends, the block portion of one of said sections being formed with a socket, a clamping screw having one end circumferentially grooved and swiveled in said block portion socket of said one section and threaded through the block portion of the other section, and a set screw threaded through said block portion into the socket thereof and into the groove of said clamping screw end to detachably retain the latter in said socket.

In testimony whereof I affix my signature.

STANISLAW WARMINSKI.

Copies of this patent may be obtained for five cents each, by addressing the "Commissioner of Patents, Washington, D. C."